United States Patent [19]

Harter et al.

[11] Patent Number: 4,480,467
[45] Date of Patent: Nov. 6, 1984

[54] FLOW MONITORING DEVICE

[75] Inventors: James R. Harter; Gary M. Freeman, both of Miami, Fla.

[73] Assignee: Hyperion, Inc., Miami, Fla.

[21] Appl. No.: 444,999

[22] Filed: Nov. 29, 1982

[51] Int. Cl.³ .......................... G01F 1/68; G01F 15/14
[52] U.S. Cl. ...................................... 73/204; 73/273; 340/606
[58] Field of Search ........................ 73/204, 201, 273; 128/724; 285/66; 340/606

[56] References Cited

U.S. PATENT DOCUMENTS

| 764,395 | 7/1904 | Sweed et al. | 285/66 |
| 2,591,195 | 4/1952 | Picciano | 73/204 |
| 2,777,325 | 1/1957 | Groenhof et al. | 73/204 |
| 3,992,940 | 11/1976 | Platzer, Jr. | 73/204 |
| 4,028,689 | 6/1977 | Schopp | 340/606 X |
| 4,135,396 | 1/1979 | Stanke et al. | 73/204 |
| 4,357,936 | 11/1982 | Ellestad et al. | 73/204 X |

Primary Examiner—Charles A. Ruehl
Attorney, Agent, or Firm—Henry W. Collins; Thomas R. Vigil

[57] ABSTRACT

The flow monitoring device comprises a housing having a passageway therethrough for liquid flow through the housing. The passageway has an inlet opening and an outlet opening. A first thermistor is provided for sensing the temperature of the liquid in the passageway at a place near the inlet opening. A heating resistor is provided for heating the liquid at a place near the outlet opening and a second thermistor is provided for sensing the temperature of the liquid at the place near the outlet opening. A control circuit controls the input of heat energy to the heating resistor for heating the liquid just enough to maintain a predetermined temperature differential between the first and second thermistors. The passageway has a first larger-in-cross-section passageway portion at the place of the first thermistor for enhancing temperature sensing, a second larger-in-cross-section passageway portion at the place of the second thermistor for enhancing temperature sensing and a smaller-in-cross-section passage between the first and second larger passageway portions to cause a higher flow rate between those portions to thermally isolate those portions thereby to minimize, if not altogether eliminate, thermal pollution between those portions. The first and second passageway portions gradually widen from their inlet and outlet ends to the larger-in-cross-section portions to minimize turbulent flow through said first and second portions.

38 Claims, 4 Drawing Figures

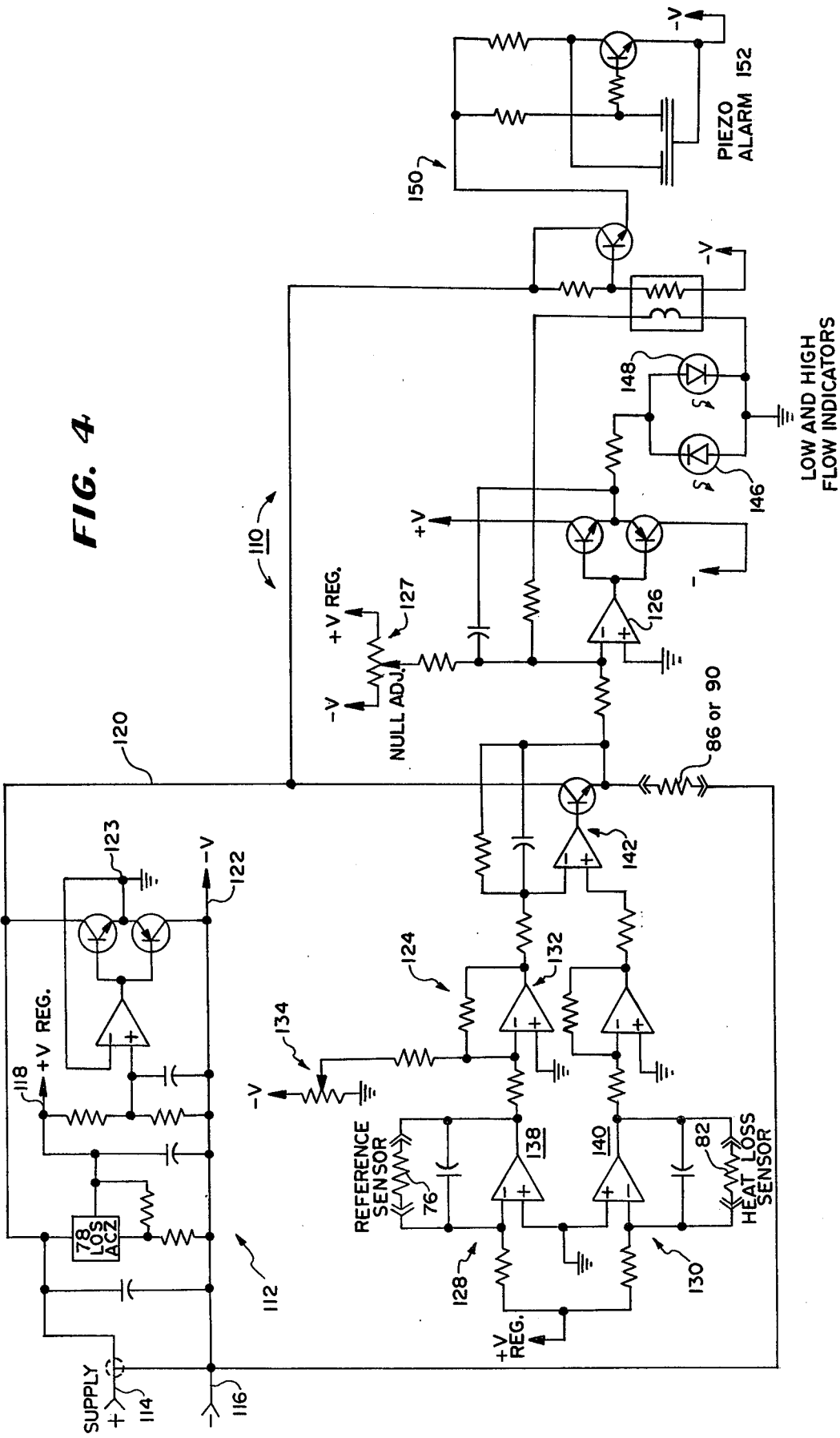

FLOW MONITORING DEVICE

BACKGROUND OF THE INVENTION

1. Field of the Invention

The present invention relates to a flow monitoring device and more particularly to a flow monitoring device including a heated sensor which forms part of a bridge circuit that furnishes electrical heating power to the sensor to maintain the temperature of the sensor above the ambient temperature at a reference sensor upstream from the heated sensor. When the heated sensor is exposed to a flow stream of liquid, the flow stream carries heat away from the heated sensor and the rate at which heat is lost from the sensor is a direct measurement of liquid velocity. Such a flow monitoring device further includes electrical control circuitry for maintaining a predetermined temperature differential between the upstream sensor and the heated sensor and for sensing the amount of electrical/heat energy required to maintain the temperature differential which is indicative of the change of the flow rate of the liquid above or below a predetermined flow rate.

2. Description of the Prior Art

Heretofore flow monitoring devices of the type which include a heated sensor and an upstream reference sensor have been proposed for sensing the flow rate of liquid such as biomedical fluids.

For example, a flow monitoring sensor is disclosed in the fall, 1980 NASA Tech Briefs in an article entitled: "Flow Sensor for Biomedical Fluids". This publication discloses the provision of upstream and downstream thermistors which have a constant temperature difference maintained between them by a resistance heater. The electric power consumed by the heater in maintaining the constant temperature difference is a measure of the flow rate which is used to control accurately the flow rate through a pump or valve.

In French Pat. No. 2 278 061 a fluid flow measurement device that detects differential heating in a pipe using a bridge circuit with two thermistor arms is disclosed.

In Bulletin 600 published by CGS/Datametrics, a division of CGS Scientific Corporation of Watertown, Mass. entitled "Heat Sensor Finds Wide Applications in Fluid Flow Measurements" there is disclosed a heated sensor that is part of a bridge circuit that furnishes electric heating power to the sensor to maintain the temperature of the sensor above the ambient temperature upstream of the liquid flow.

Similarly, a flow meter operating on a temperature difference between sensors that are situated in legs of a bridge circuit is disclosed in German printed patent application no. 27 35 118.

Other systems for monitoring a flowing liquid are disclosed in U.S. Pat. Nos. 3,279,251; 3,535,927; and 3,898,637.

As will be described in greater detail hereinafter, the flow monitoring device of the present invention and the housing assembly forming a part thereof differ from the previously proposed flow monitoring systems disclosed in the publications referred to above by providing means for enhancing the sensing of the temperature of the flowing liquid at the upstream end and at the heated sensor. Such enhancement of temperature sensing is accomplished by providing enlarged cross section sensing chambers in the housing assembly where the flow of the liquid is slowed to enhance temperature sensing and which chambers are configured to minimize turbulent flow through the chambers.

In a preferred embodiment, the housing assembly has transverse bores which extend from an outer side wall of the housing assembly to respective ones of the sensing chambers. A thermally conductive thimble shaped member is received in and through each one of the transverse bores in a fluid tight manner and extends into the respective sensing chamber. This construction enables the housing assembly to be removably mounted over and on a heated sensor and a reference sensor and then removed therefrom and discarded with a tubing liquid delivery set. This construction also provides non-invasive monitoring of the flow of liquid through the housing assembly of the flow monitoring device.

Furthermore, the flow monitoring device has a reduced in cross-section passageway communicating between the larger in cross-section chambers, which reduced in cross-section passageway serves to "isolate" the chambers from each other. In other words, the higher velocity flow through the passageway prevents "thermal pollution" between the chambers.

This is important since, heretofore, with prior devices utilizing a cylindrical chamber containing both the reference and heat loss probes, effective performance at medium and low flow rates required vertical orientation of the cylindrical chamber with the heat loss probe at the top. With that orientation, "thermal pollution" due to convection flow and differences was prevented. With the heat loss probe at the bottom, the prior device was ineffectual and with horizontal orientation rate change detection sensitivity was reduced.

In contrast, the flow monitoring device of the present invention with the reduced-in-cross-section connecting passageways can be effectively operated in any position.

Such housing assembly further differs from the previously proposed flow monitoring systems by its construction from two identical end parts and one middle part which are easily molded from a clear plastic material and easily assembled together to form a passage means therethrough with spaced apart larger cross section sensing chambers.

SUMMARY OF THE INVENTION

According to the invention there is provided a flow monitoring device comprising a housing having passage means therethrough for allowing a liquid to flow through said housing, an inlet opening communicating with said passage means and an outlet opening communicating with said passage means, first means for sensing the temperature of the liquid in said passage means at a place near said inlet opening, means for heating the liquid at a place near said outlet opening, second means for sensing the temperature of the liquid in said passage means at a place near said outlet opening, control means for controlling said heating means thereby to input from said heating means to the liquid just enough heat energy to the liquid flowing through said passage means to maintain a predetermined temperature differential between said first and second temperature sensing means, energy sensing means for sensing the amount of energy supplied to said heating means to develop said heat energy, the energy sensed being related to and indicative of the liquid flow rate through said housing, first means associated with said first temperature sensing means for enhancing the temperature sensing thereof, and second means associated with said second temperature sensing means for enhacing the temperature sensing thereof.

Preferably, the first enhancing means are defined by a first enlarged cross-section portion of said passage means in said housing, which first portion forms a first sensing chamber and said second enhancing means are defined by a second enlarged cross-section portion of said passage means in said housing, which second portion forms a second sensing chamber. Also, preferably, the chambers gradually widen from their inlet and outlet ends to said enlarged cross-section portion thereof to miminize turbulent flow through the chambers.

Further according to the invention there is provided for use in a flow monitoring device, a housing assembly comprising first and second identical end parts each having a nozzle at one end with a passageway extending through said nozzle and having a wider diameter body portion with a cavity therein having a larger cross section than said passageway, and a middle part having a central body portion with identical bosses extending therefrom, each boss being adapted to be received in one of the larger cross section cavities in said end part and having a central passageway therethrough.

Preferably, a sensing chamber is defined by each larger cross-section cavity and the boss received therein, and the inlet and outlet of each chamber gradually widens from the respective inlet and outlet passageways to the larger cross-section cavity to minimize flow through each chamber defining cavity.

Still further according to the invention there is provided a flow monitoring device comprising a housing having passage means therethrough for allowing a liquid to flow through said housing, an inlet opening communicating with said passage means and an outlet opening communicating with said passage means, first means for sensing the temperature of the liquid in said passage means at a place near said inlet opening, means for heating the liquid at a place near said outlet opening, second means for sensing the temperature of the liquid in said passage means at a place near said outlet opening, control means for controlling said heating means thereby to input from said heating means to the liquid just enough heat energy to the liquid flowing through said passage means to maintain a predetermined temperature differential between said first and second temperature sensing means, energy sensing means for sensing the amount of energy supplied to said heating means to develop said heat energy, the energy sensed being related to and indicative of the liquid flow rate through said housing and said passage means between said respective first and second sensing means being reduced-in-cross-section to cause a higher flow rate between the sensing means than in the passage means at the respective sensing means thereby to thermally isolate said first and second sensing means to minimize, if not altogether eliminate, thermal pollution between said first and second sensing means.

Preferably, the passage means has a first larger-in-cross-section portion, a second larger-in-cross-section portion and a connecting portion defined by the reduced-in-cross-section portion of said passage means therebetween. The first and second larger-in-cross-section portions have the respective first and second sensing means therein.

Preferably, the first and second portions gradually widen from their inlet and outlet ends to the larger-in-cross-section area of said portions to minimize turbulent flow through said larger-in-cross-section portions.

In some embodiments the gradual widening is achieved by making the sensing chambers or enlarged cross-section portions generally oval in shape with rounded ends that gradually widen from an inlet or outlet of the chamber or larger-in-diameter portion to the main area of the oval shape chamber.

Further, in some embodiments, the housing is made of three plastic parts comprising identical first and second end parts and a middle part.

Also in some preferred embodiments, the housing is provided with first and second transverse bores which communicate with the first and second sensing chambers or enlarged diameter sections. Each bore receives a conductive thimble-like member which is fixed in the bore in a fluid tight manner and each thimble-like member is adapted to receive a first or second removable sensing probe assembly whereby monitoring of the liquid through the passage means is achieved in a non-invasive manner and whereby the housing can be part of a liquid delivery set that is discharged after measurements are made and after the probe assemblies are removed for reuse.

Still further in some embodiments, the control means can include a bridge circuit with one leg of the bridge including a thermistor defining one of the temperature sensing means and a null/flow indicating comparator can be coupled to the bridge and can have an output coupled to a low flow and high flow indicating circuit.

BRIEF DESCRIPTION OF THE DRAWINGS

FIG. 4 is a schematic circuit diagram of the electrical circuit for the flow monitoring device.

DESCRIPTION OF THE PREFERRED EMBODIMENT

Figure 1:
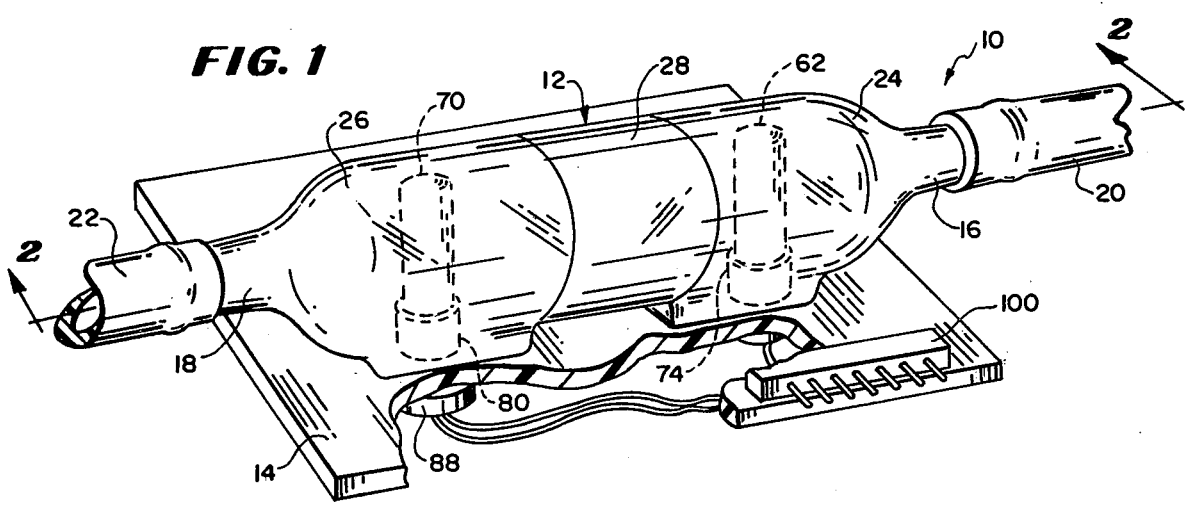
FIG. 1 is a perspective view with portions broken away of the flow monitoring device of the present invention.
Figure 2:
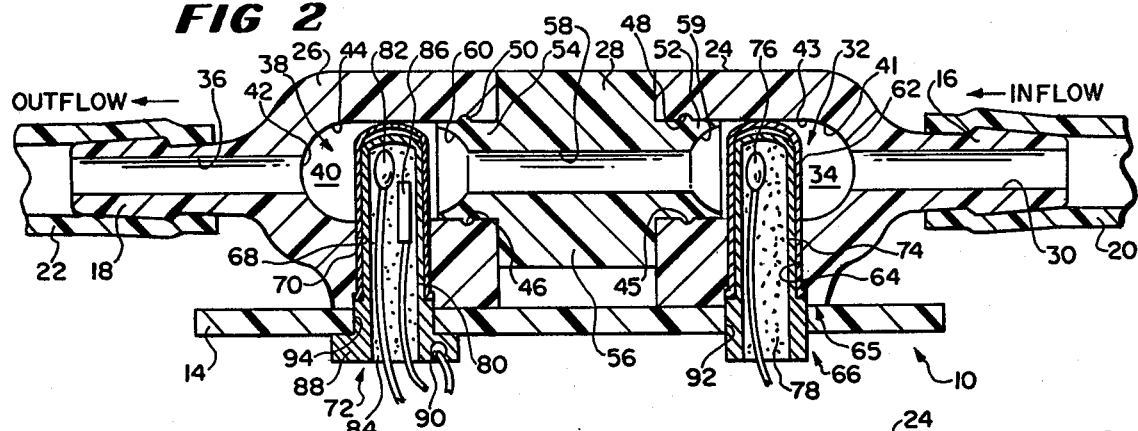
FIG. 2 is a sectional view taken along line 2—2 of FIG. 1.
Figure 3:
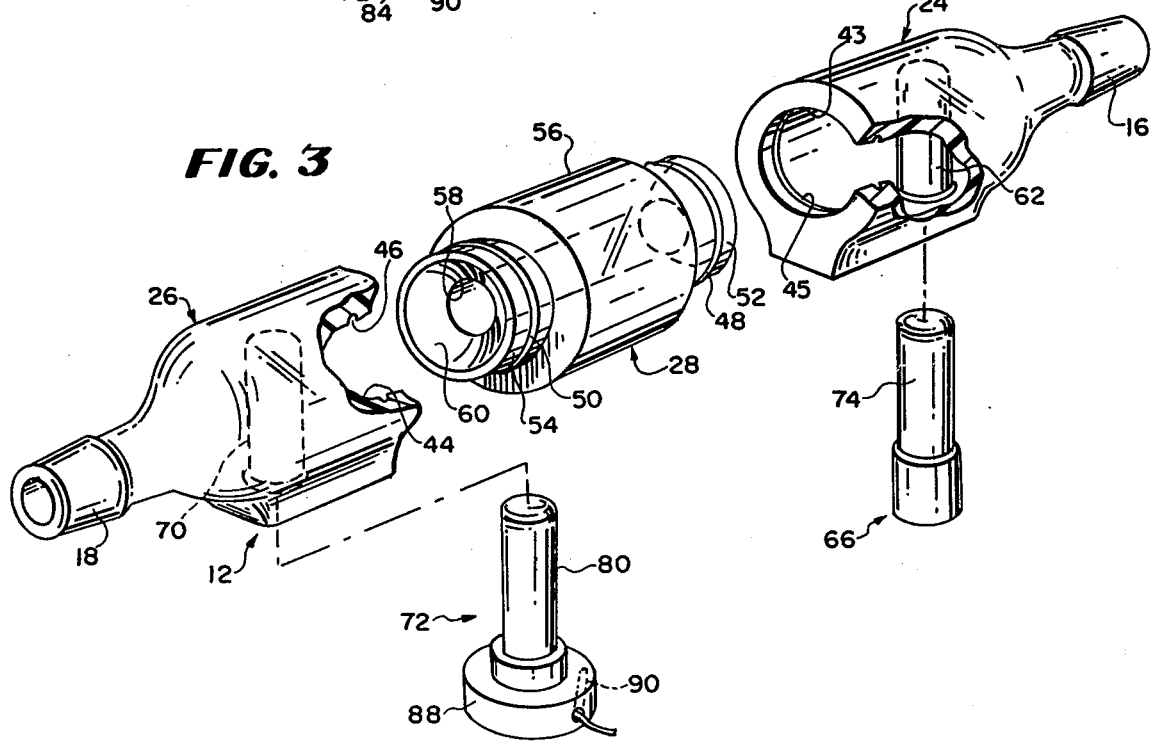
FIG. 3 is an exploded perspective view of the flow monitoring device with portions broken away.

Referring now to the drawings in greater detail there is illustrated in FIG. 1 a flow monitoring device 10 including a housing assembly 12 mounted on a base board 14. This flow monitoring device 10 has an inlet nozzle 16 and an outlet nozzle 18. As shown in FIGS. 1 and 2, one end of a flexible tubing 20 is received over the inlet nozzle 16 and one end of another flexible tubing 22 is received over the outlet nozzle 18.

As shown in FIGS. 1 and 2, the housing assembly 12 is comprised of two identical end parts 24 and 26 and a middle part 28. The end part 24 has the nozzle 16 extending from one end thereof and a bore 30 extending through the nozzle 16 to a wider in cross section cavity 32 defining part of a first sensing chamber 34. The other end part 26 has the same construction with a bore 36 in nozzle 18 and a cavity 38 defining part of a second sensing chamber 40.

The larger in cross section cavities 32 and 38 each have a semispherical inner end 41 or 42 which communicates with the throughbore 30 or 36 and a cylindrical portion 43 or 44 which extends to the middle part 28. In each cylindrical portion 43 or 44 there is provided an annular slot 45 or 46 in which is received a mating annular rib 48 or 50 each of which is formed on a cylindrical boss 52 or 54 extending from an end of the middle part 28.

It will be noted that the middle part 28 has the cylindrical bosses 52, 54 extending from each end thereof and a wider in diameter body portion 56. Extending through the body portion 56 and through the bosses 52 and 54 is a "thermal isolating" throughbore or passageway 58 which opens at the end of each boss 52, 54 into a semispherical end cavity 59 or 60 which is designed to open into the cavity 32 or 38 to define part of the sensing chamber 34 or 40. The passageway 58 is of much smaller cross-section than the sensing chambers 34 and 40 such that a higher velocity flow therethrough serves to "isolate" chamber 40 from chamber 34.

It will be noted that with this construction of the housing assembly 12 of the flow monitoring device 10, the end parts 24 and 26 being identical facilitates construction of the housing assembly 12. Also, the middle part 28 with identical end bosses 52, 54 needs to special alignment for assembling the flow monitoring device 10, i.e., the housing assembly 12, to form the first and second sensing chambers 34 and 40.

It is also to be noted that the diameter of the bore 58 in the middle part 28 is identical to the diameter of the bores 30 and 36 in the nozzles 16 and 18 of the end parts 24 and 26. In this way, liquid flowing into the flow monitoring device 10 will be travelling at one speed through the bore 30. Then, it will expand into the first sensing chamber 34 and flow through this chamber 34 at a much slower speed. Then, when it reaches the bore 58 in the middle part 28, it will flow again at a higher speed, the same speed as in the first bore 30, until it reaches the second sensing chamber 40 where again its speed is slowed down until it reaches the bore 36 in the nozzle 18 and flows out of the assembly 10. This is an important feature of the flow monitoring device 10 of the present invention in that the velocity of the flow is slowed in chambers 34 and 40 to minimize turbulence effects, to enhance circulation of the liquid in each chamber 34 and 40 and to enhance temperature sensing of liquid in the first chamber 34 and heating and temperature sensing of the liquid in the second chamber; and the velocity is increased in bore 58 to effectively "thermally isolate" chamber 40 and chamber 34.

As best shown in FIG. 2, the device 10 further includes a thin-walled, high thermal conductivity, metal, thimbleshaped member 62 which is pressed into or molded into a transverse bore 64 extending from a bottom side 65 of end part 24 upwardly into the cylindrical cavity 32 forming part of the first sensing chamber 34 in end part 24.

This thimble-like member 62 is sealed in place by the press fit or by the molding thereof in the end part 24 to maintain liquid tight integrity of the sensing chamber 34 prior to insertion of a probe assembly 66 into the bore 64 and thimble like-member 62 and to provide good thermal coupling from the member 62 to the probe assembly 66 when such probe assembly 66 is inserted into the thimble like member 62.

In like manner, the end part 26 has a transverse bore 68 in which is press fitted or molded a metal thimble-like member 70 into which is inserted a second probe assembly 72.

As shown, the first probe assembly 66 is slip fitted into the thimble like member 62 and is comprised of a metal shell 74 having a temperature sensing probe 76 received within the shell 74 and held therein by a thermally conductive sealant or fillant material 78. The second probe assembly 72 can have the same or a modified shell 80 slip fitted into the thimble like member 70 and has received therein a temperature sensing member 82 which also is embedded in a thermally conductive sealant or fillant material.

In one embodiment, a heating element 86 is inserted into the shell 80 and also held in place by the thermally conductive sealant/fillant material 84. In another alternative embodiment the shell 80 has a thick washer pressed thereon to form a flange 88 at the base of the shell 80. A heating element 90 is inserted in a cavity in the flange 88 and this embodiment is preferred since the heating element is in direct contact with the metal shell 80 to transfer heat to same and to liquid in chamber 40. Secondly, the flange 88 at the bottom of the shell 80 forms a means for axially locating the assembly on the base board 14.

The bottle shaped end parts 24 and 26 are received onto the respective bosses 52 and 54 on either side of the middle part 28 having a roller pin shape to form the housing assembly 12.

Then the housing assembly 12 thus formed can be placed on the base board 14 with the transverse bors 64 and 68 aligned with openings 92 and 94 in the base board 14 through which the respective metal shells 80 and 74 are received when they are inserted into the metallic thimble like members 62 and 70.

Also, and as shown in FIG. 1, a terminal block 100 is mounted on and provides a convenient means for coupling the probes 76 and 82 and heating element 86 or 90 to a circuit board/capsule containing an electrical circuit 110 shown in FIG. 4.

In constructing the housing assembly 12 and the device 10 with the use of tooling jigs, the thimble like members 62 and 70 are installed or molded into the bottle shaped, chamber forming end parts 24 and 26 and the end parts 24 and 26 are assembled by use of simple tooling comprising two locating pins, each mounted in alignment with each other on interlocked, sliding tool base members (not shown). The tool base members can be mounted on a dovetail or equivalent slide. Then, when the tool base members are telescoped together, they can provide guide pin spacing identical to the desired spacing between the probe assemblies 66 and 72. When the parts 24, 26 and 28 are seated, a solvent adhesive can be applied to the interfitting surfaces thereof to seal the joints between the parts 24, 26 and 28 and the housing assembly 12 can then be slipped off the tooling pins.

The probe assemblies' metal shells 74 and 80 preferably have a diameter of 0.003 inch to 0.005 inch less than the inner diameter of the thimble like members 62 and 70.

Requisite thermal coupling is obtained by depositing a small amount of thermal compound in each thimble like member 62 and 70. Then when the housing assembly 12 with the thimble like members 62 and 70 installed therein are received over the probe assemblies 66 and 72, such assemblies 62 and 70 slip easily into place and the deposited thermal compound is uniformly extruded around the probe assemblies 66 and 72. Typically, the metal shells 74 and 80 of the probe assemblies or units 66 and 72 are permanently installed on the base board 14.

Thus, in addition to providing the enlarged passageways or sensing chambers 34 and 40 in the housing assembly 12 to minimize turbulence in the area of the sensing by the probe assemblies 66 and 72 and to provide a slower flow to enhance temperature sensing and heat transfer and providing the reduced-in-diameter passageway 58 to obtain a higher velocity flow thereby to provide "thermal isolation" between the chambers 34 and 40, the component parts 24, 26 and 28 of the housing assembly 12 are simple to make by plastic molding techniques and are simple to assemble into the housing assembly 12. Such parts 24, 26 and 28 are typically made of a clear plastic material.

The flow monitoring device 10 is operable to measure or monitor changes in the amount of heat input to a flowing liquid to maintain a predetermined temperature differential between the place of heat input and a place upstream, the changes in heat input being indicative of a change in flow rate. The heating element 86 or 90 is heated to maintain the liquid in the sensing chamber 40 at a positive constant temperature differential above the temperature of the liquid in sensing chamber 34. Typically, this temperature differential is 10° to 15° C.

The heat input necessary to maintain the heated shell 80 a constant differential temperature to the shell 74 is a direct measure of the amount of heat being dissipated to the liquid which in turn is non-linearly proportional to the rate of liquid flow.

At a constant flow rate, the heat input to the liquid is constant. Any deviation of this input reflects flow rate changes. Also, any air bubbles flowing in the system with which the device 10 is used dramatically affect the heat loss to the liquid as they pass through the chambers 34 and 40 and thus are easily detectible.

Since the probe assemblies 66 and 72 do not come in contact with the liquid, the housing assembly 12 providing noninvasive flow monitoring, the housing assembly 12 can be a permanent part of a liquid delivery system and then easily discarded therewith, with the base board 14 and probe assemblies 66 and 72 being retained for use with another housing assembly 12.

Referring now to FIG. 4 there is illustrated therein a schematic circuit diagram of the electrical circuit 110 of the device 10. As shown, the circuit 110 includes a voltage supply circuit 112 which receives a supply voltage on input lines 114 and 116 and supplies a regulated positive voltage at an output 118 and unregulated positive voltage on a positive bus 120, negative voltage at an output 122, and system ground or common originating at 123.

The deviation in heat input, namely electrical energy input to heating element 86 or 90, is sensed by a bridge circuit 124 which is balanced at a given flow rate to provide a voltage input to a nulling comparator 126 which also receives a nulling voltage from a nulling potentiometer 127 which is set to null the indicator circuit at the time flow is first established at a desired rate through the housing assembly 12.

In the bridge circuit 124 the temperature sensing probe 76 is realized by a thermistor 76 which is connected in a feedback loop of an operational amplifier 128. This thermistor 76 senses the temperature of the liquid flowing in the first sensing chamber 34.

The temperature sensing probe 82 is realized by an identical thermistor 82 which is connected in a feedback loop of another operational amplifier 130.

The output of the thermistor 76 which can be referred to as a reference thermistor 76 is fed to a further operational amplifier 132 where an offset from a potentiometer 134 is applied to it to shift its apparent temperature indication by +10° to +15° C.

Thus the output of one leg 138 of the bridge circuit 124 including op amps 128 and 132 indicates a constant 15° C. temp. higher than the temperature of the incoming liquid.

This shifted reference temperature and the output of the thermistor 82, which can be referred to as the heat loss thermistor, in another leg 140 of the bridge circuit 124 are connected to a drive circuit 142 for driving or energizing the heating element 86 or 90 which is realised by a resistor 86 or 90.

The above described circuit arrangement serves to keep the shell 80 of probe assembly 72 at a temperature of 15° C. warmer than the temperature of the incoming liquid.

The voltage applied to the heating element/resistor 86 or 90 is used to monitor changes in electrical/heat input to the probe assembly 72 which in turn is a measure of liquid flow changes. This is the voltage input supplied to one input of the nulling comparator 126.

Under steady state conditions the comparator 126 has an output of zero and the output deviates from zero as the heat input to the probe assembly 72 varies with flow rate changes.

The output of comparator 126 is coupled to back-to-back LED's 146 and 148 which are reverse connected to the output of comparator 126 so that one LED 146 lights up on a flow rate decrease and the other LED 148 lights up on a flow rate increase from a desired flow rate.

Also voltage across resistors 86, 90 can be used to drive an audio alarm circuit 150 including a piezo alarm 152 or to a control circuit (not shown) for shutting off a pump.

In setting up the flow monitoring device 10, a tubing delivery set including tubings 20 and 22 and the housing assembly 12 is installed on a pump (not shown). Then the probe assemblies 66 and 72 are inserted in thimble like members 62 and 70 by pressing the housing assembly 12 on the shells 74 and 80.

Now the operator must establish a desired flow rate in the liquid delivery system making sure that all air bubbles have been cleared from the chambers 34 and 40. Then, when the operator has established the desired flow rate, the flow indicating or nulling comparator 126 is nulled by appropriate adjustment of nulling potentiometer 127 and any additional alarm circuits are deactivated.

The flow monitoring device 10 of the present invention is particularly designed to detect changes in the flow rate of a liquid when used in connection with a liquid delivery system. A particular application of such a liquid delivery system is in the administration of fluids to patients by means of peristaltic or syringe pumps where it is necessary to detect certain flow conditions. For example, it is desirable to detect a flow rate increase or decrease. It is also desirable to detect an occlusion in the delivery line of the liquid delivery system. Further it is desirable to detect air bubbles in the liquid delivery line. The flow monitoring device 10 of the present invention enables one easily to detect such conditions.

Moreover, the flow monitoring device 10 of the present invention has a number of advantages, some of which have been described above and others of which are inherent in the invention. In particular, the flow monitoring device 10 of the present invention is highly sensitive to changes in flow rate; it functions independently of ambient conditions such as the temperature of the liquid being delivered; it has a wide dynamic range being capable of monitoring flow rates from 5 ml. per hour to 300 ml. per hour; and lastly, it is very compatible with disposable liquid delivery tubing sets.

Also it will be apparent to those skilled in the art that modifications can be made to the flow monitoring device 10 of the present invention without departing from the teachings of the invention. Accordingly, the scope of the invention is only to be limited as necessitated by the accompanying claims.

We claim:

1. A flow monitoring device comprising a housing having passage means therethrough for allowing a liquid to flow through said housing, an inlet opening communicating with said passage means and an outlet opening communicating with said passage means, first means for sensing the temperature of the liquid in said passage means at a place near said inlet opening, means for heating the liquid at a place near said outlet opening, second means for sensing the temperature of the liquid in said passage means at a place near said outlet opening, control means for controlling said heating means thereby to input from said heating means to the liquid just enough heat energy to the liquid flowing through said passage means to maintain a predetermined temperature differential between said first and second temperature sensing means, energy sensing means for sensing the amount of energy supplied to said heating means to develop said heat energy, the energy sensed being related to and indicative of the liquid flow rate through said housing, first means associated with said first temperature sensing means for enhancing the temperature sensing thereof, and second means associated with said second temperature sensing means for enhancing the temperature sensing thereof, said first enhancing means being defined by a first enlarged cross-section portion of said passage means in said housing which first portion forms a first sensing chamber and said second enhancing means being defined by a second enlarged cross-section portion of said passage means in said housing which second portion forms a second sensing chamber, and said chambers gradually widening from their inlet and outlet ends to said enlarged cross-section portion thereof to minimize turbulent flow through said chambers.

2. The device of claim 1 wherein said sensing chambers are generally oval in shape with the elongate axis of each chamber being coaxial with the axis of said passage means thereby to provide said gradual widening of the passage means at the inlet end and outlet ends of each of said chambers to minimize turbulent flow therethrough.

3. The device of claim 1 wherein said passage means comprise three bores of equal diameter separated by said two sensing chambers, said bores being coaxial with each other and by reason of having the same diameter, enhance the accuracy of measurement of changes in heat input to the liquid flowing through said second sensing chamber.

4. The device of claim 1 wherein said housing is made of a plastic material.

5. The device of claim 1 wherein said housing is made of a clear plastic material.

6. The device of claim 1 wherein said housing is made of three plastic parts comprising identical first and second end parts and a middle part, each end part having a generally bottle shape with a nozzle extending from one end thereof with a passageway extending through said nozzle to a larger in cross section cavity in said end part, which cavity defines part of one of said sensing chambers.

7. The device of claim 6 wherein said middle part comprises a central body portion having identical bosses extending from each end thereof, and having a central passageway extending through said middle part, each boss being adapted to be received in a cavity in one of said end parts to mate therewith and form between the end of a boss and the inner end of a cavity one of said sensing chambers.

8. The device of claim 7 wherein said passageway through each end part and said central passageway through said middle part all have the same diameter.

9. The device of claim 7 wherein the inner end of each cavity in each end part is rounded and each boss of said middle part has a rounded countersunk cavity in the end thereof in communication with the central passageway through said middle part, each sensing chamber being defined by a cavity in one end part and one of said countersunk cavities in said boss.

10. The device of claim 1 wherein said housing has a first transverse bore extending from an outer side wall thereof to and in communication with said first sensing chamber and a second transverse bore extending from an outer side wall thereof to and in communication with said second sensing chamber, and first and second heat conductive thimble-like members being received respectively through each one of said transverse bores and into said respective sensing chamber in a fluid tight manner, each thimble-like member when so mounted being adapted to receive a first or second movable sensing probe assembly therein such that the monitoring of liquid flowing through said passage means is achieved in a non-invasive manner whereby said housing can be part of a liquid delivery set and discarded therewith, with the first and second probe assemblies being removed from the thimble-like members for reuse, said first sensing probe assembly having said first temperature sensing means received therein and said second sensing probe assembly having said second temperature sensing means received therein and having said heating means associated therewith.

11. The device of claim 10 wherein said first probe assembly comprises a metallic shell adapted to be received in said thimble-like member and having therein said first temperature sensing means in the form of a thermistor embedded within a thermally conductive fillant material in said shell.

12. The device of claim 10 wherein said second probe assembly comprises a metallic shell adapted to be received within said thimble-like member and having therein said second temperature sensing means in the form of a thermistor embedded within a thermally conductive fillant material in said shell.

13. The device of claim 12 wherein said heating means comprise a heating resistor also embedded within said thermally conductive fillant material in said shell.

14. The device of claim 12 wherein said shell has a larger in diameter base flange portion with a cavity therein and said heating means comprise a heating resistor received in said cavity in said flange.

15. The device of claim 10 further including a base board having said housing situated on the top side thereof and with said probe assemblies extending through openings in the base board into the transverse bores in said housing and into said thimble-like members.

16. The device of claim 1 wherein said control means include a bridge circuit one leg of which includes a thermistor defining said first temperature sensing means and the other leg of which includes a thermistor defining said second temperature sensing means, the voltage of said first leg being offset a predetermined amount related to a predetermined temperature differential and wherein said control means further include a nulling/-flow indicating comparator which has one input thereof coupled to the output of said bridge circuit and to a nulling potentiometer and has an output thereof coupled to a low and high flow indicating circuit.

17. The device of claim 1 wherein said passage means include a reduced-in-cross-section passageway between said first and second enlarged cross-section portions, said reduced-in-cross-section passageway causing a higher flow rate between the first and second enlarged cross-section portions thereby to thermally isolate them and minimize, if not altogether eliminate, thermal pollution between said first and second enlarged cross-sections portions.

18. For use in a flow monitoring device, a housing assembly comprising first and second identical end parts each having a nozzle at one end with a passageway extending through said nozzle and having a wider diameter body portion with a cavity therein having a larger cross-section than said passageway, and a middle part having a central body portion with identical bosses extending therefrom, each boss being adapted to be received in one of the larger cross-section cavities in one of said end parts and having a central passageway therethrough, a sensing chamber being defined by each larger cross-section cavity and the boss received therein, and the inlet and outlet ends of each chamber gradually widening from respective smaller-in-diameter passageway portions to the larger cross-section cavity to minimize turbulent flow through each chamber defining cavity.

19. The housing assembly of claim 18 wherein said passageway through said nozzle of each end part and the central passageway through said middle part are of the same diameter.

20. The housing assembly of claim 18 wherein each of said end parts has a transverse bore extending from one outer side wall thereof to and in communication with the larger cross section cavity therein and each end part has a heat conductive thimble like member press fitted or molded into said transverse bore with the closed end of said thimble extending into said cavity, each said thimble-like member being adapted to receive a probe assembly therein for forming a flow monitoring device.

21. The housing assembly of claim 18 wherein the inner end of each cavity is rounded and the outer end of each boss of said middle part has a rounded countersunk cavity therein, the space between the countersunk cavity of said boss and the inner end of said cavity defining a sensing chamber having rounded or curved end walls to minimize turbulent flow through the sensing chamber.

22. The housing assembly of claim 18 wherein said end parts and said middle part are made of plastic material.

23. The housing assembly of claim 18 wherein each nozzle of an end part is constructed and arranged to receive the end of a tubing thereover.

24. The housing assembly of claim 18 wherein said end parts and the middle part are made of a clear plastic material.

25. The housing assembly of claim 18 wherein said end parts have a bottle like shape and said middle part has a rolling pin like shape.

26. The housing assembly of claim 18 wherein said cavity in each end part has an annular slot therein and each of said bosses extending from said middle part has an annular rib thereon for engaging an annular slot.

27. A flow monitoring device comprising a housing having passage means therethrough for allowing a liquid to flow through said housing, an inlet opening communicating with said passage means and an outlet opening communicating with said passage means, first means for sensing the temperature of the liquid in said passage means at a place near said inlet opening, means for heating the liquid at a place near said outlet opening, second means for sensing the temperature of the liquid in said passage means at a place near said outlet opening, control means for controlling said heating means thereby to input from said heating means to the liquid just enough heat energy to the liquid flowing through said passage means to maintain a predetermined temperature differential between said first and second temperature sensing means, energy sensing means for sensing the amount of energy supplied to said heating means to develop said heat energy, the energy sensed being related to and indicative of the liquid flow rate through said housing, said passage means having a first larger-in-cross-section portion having said first sensing means therein, a second larger-in-cross-section portion having said second sensing means therein, and a smaller-in-cross-section connecting portion between said respective first and second portions for causing a higher flow rate between said first and second sensing means than in the passage means at the respective sensing means thereby to thermally isolate said first and second sensing means to minimize, if not altogether eliminate, thermal pollution between said first and second sensing means, and said first and second portions gradually widening from their inlet and outlet ends to said larger-in-cross-section portions to minimize turbulent flow through said larger-in-cross-section portions.

28. A flow monitoring device comprising a housing having passage means therethrough for allowing a liquid to flow through said housing, an inlet opening communicating with said passage means and an outlet opening communicating with said passage means, first means for sensing the temperature of the liquid in said passage means at a place near said inlet opening, means for heating the liquid at a place near said outlet opening, second means for sensing the temperature of the liquid in said passage means at a place near said outlet opening, control means for controlling said heating means thereby to input from said heating means to the liquid just enough heat energy to the liquid flowing through said passage means to maintain a predetermined temperature differential between said first and second temperature sensing means, energy sensing means for sensing the amount of energy supplied to said heating means to develop said heat energy, the energy sensed being related to and indicative of the liquid flow rate through said housing, first means associated with said first temperature sensing means for enhancing the temperature sensing thereof, and second means associated with said second temperature sensing means for enhancing the temperature sensing thereof, said first enhancing means being defined by a first enlarged cross-section portion of said passage means in said housing which first portion forms a first sensing chamber and said second enhancing means being defined by a second enlarged cross-section portion of said passage means in said housing which second portion forms a second sensing chamber, said sensing chambers being generally oval in shape with the elongate axis of each chamber being coaxial with the axis of said passage means thereby to provide gradual widening of the passage means at the inlet and outlet ends of said chambers to minimize turbulent flow therethrough.

29. A flow monitoring device comprising a housing having passage means therethrough for allowing a liquid to flow through said housing, an inlet opening communicating with said passage means and an outlet opening communicating with said passage means, first means for sensing the temperature of the liquid in said passage means at a place near said inlet opening, means for heating the liquid at a place near said outlet opening, second means for sensing the temperature of the liquid in said passage means at a place near said outlet opening, control means for controlling said heating means thereby to input from said heating means to the liquid just enough heat energy to the liquid flowing through said passage means to maintain a predetermined temperature differential between said first and second temperature sensing means, energy sensing means for sensing the amount of energy supplied to said heating means to develop said heat energy, the energy sensed being related to and indicative of the liquid flow rate through said housing, first means associated with said first temperature sensing means for enhancing the temperature sensing thereof, and second means associated with said second temperature sensing means for enhancing the temperature sensing thereof, said first enhancing means being defined by a first enlarged cross-section portion of said passage means in said housing which first portion forms a first sensing chamber and said second enhancing means being defined by a second enlarged cross-section portion of said passage means in said housing which second portion forms a second sensing chamber, and said housing being made of three plastic parts comprising identical first and second end parts and a middle part, each end part having a generally bottle shape with a nozzle extending from one end thereof and with a passageway extending through said nozzle to a larger-in-cross-section cavity in said end part, which cavity defines part of one of said sensing chambers.

30. The device of claim 29 wherein said middle part comprises a central body portion having identical bosses extending from each end thereof, and having a central passageway extending through said middle part, each boss being adapted to be received in a cavity in one of said end parts to mate therewith and form between the end of a boss and the inner end of a cavity one of said sensing chambers.

31. A flow monitoring device comprising a housing having passage means therethrough for allowing a liquid to flow through said housing, an inlet opening communicating with said passage means and an outlet opening communicating with said passage means, first means for sensing the temperature of the liquid in said passage means at a place near said inlet opening, second means for sensing the temperature of the liquid in said passage means at a place near said outlet opening, control means for controlling said heating means thereby to input from said heating means to the liquid just enough heat energy to the liquid flowing through said passage means to maintain a predetermined temperature differential between said first and second temperature sensing means, energy sensing means for sensing the amount of energy supplied to said heating means to develop said heat energy, the energy sensed being related to and indicative of the liquid flow rate through said housing, first means associated with said first temperature sensing means for enhancing the temperature sensing thereof, and second means associated with said second temperature sensing means for enhancing the temperature sensing thereof, said first enhancing means being defined by a first enlarged cross-section portion of said passage means in said housing which first portion forms a first sensing chamber and said second enhancing means being defined by a second enlarged cross-section portion of said passage means in said housing which second portion forms a second sensing chamber, said housing having a first transverse bore extending from an outer side wall thereof to and in communication with said first sensing chamber and a second transverse bore extending from an outer side wall thereof to and in communication with said second sensing chamber, and first and second heat conductive thimble-like members being received respectively through each one of said transverse bores and into said respective sensing chamber in a fluid tight manner, each thimble-like member, when so mounted, being adapted to receive a first or second removable sensing probe assembly therein such that the monitoring of liquid flowing through said passage means is achieved in a non-invasive manner whereby said housing can be part of a liquid delivery set and discarded therewith, with the first and second probe assemblies being removed from the thimble-like members for reuse, said first sensing probe assembly having said first temperature sensing means received therein and said second sensing probe assembly having said second temperature sensing means received therein and having said heating means associated therewith.

32. A flow monitoring device comprising a housing having passage means therethrough for allowing a liquid to flow through said housing, an inlet opening communicating with said passage means and an outlet opening communicating with said passage means, first means for sensing the temperature of the liquid in said passage means at a place near said inlet opening, means for heating the liquid at a place near said outlet opening, second means for sensing the temperature of the liquid in said passage means at a place near said outlet opening, control means for controlling said heating means thereby to input from said heating means to the liquid just enough heat energy to the liquid flowing through said passage means to maintain a predetermined temperature differential between said first and second temperature sensing means, energy sensing means for sensing the amount of energy supplied to said heating means to develop said heat energy, the energy sensed being related to and indicative of the liquid flow rate through said housing, first means associated with said first temperature sensing means for enhancing the temperature sensing thereof, and second means associated with said second temperature sensing means for enhancing the temperature sensing thereof, said control means including a bridge circuit one leg of which includes a thermistor defining said first temperature sensing means and the other leg of which includes a thermistor defining said second temperature sensing means, the voltage of said first leg being offset a predetermined amount relative to a predetermined temperature differential and wherein said control means further include a nulling/flow indicating comparator which has one input thereof coupled to the output of said bridge circuit and to a nulling potentiometer and has an output thereof coupled to a low and a high flow indicating circuit.

33. The device of claim 32 wherein said first enhancing means are defined by a first enlarged cross section portion of said passage means in said housing which first portion forms a first sensing chamber and said second enhancing means are defined by a second enlarged cross section portion of said passage means in said housing which second portion forms a second sensing chamber.

34. The device of claim 32 wherein said control means include a regulated voltage supply circuit for supplying voltage to said bridge circuit, to said nulling/flow indicating comparator and to said low and high flow indicating circuit.

35. The device of claim 34 wherein said low and high flow indicating circuit includes back-to-back-reverse connected light emitting diodes which are coupled to reverse biased transistors which in turn are coupled to the output of said flow indicating comparator.

36. The device of claim 32 further including an audible alarm circuit coupled to said heating means and, to the output of said bridge circuit.

37. For use in a flow monitoring device, a housing assembly comprising first and second identical end parts each having a nozzle at one end with a passageway extending through said nozzle and having a wider diameter body portion with a cavity therein having a larger cross-section than said passageway, and a middle part having a central body portion with identical bosses extending therefrom, each boss being adapted to be received in one of the larger cross-section cavities in one of said end parts and having a central passageway therethrough, each of said end parts having a transverse bore extending from one outer side wall thereof to and in communication with the larger cross-section cavity therein and each end part having a heat conductive thimble-like member press fitted or molded into said transverse bore with the closed end of said thimble extending into said cavity, each said thimble-like member being adapted to receive a probe assembly therein for forming a flow monitoring device.

38. For use in a flow monitoring device, a housing assembly comprising first and second identical end parts each having a nozzle at one end with a passageway extending through said nozzle and having a wider diameter body portion with a cavity therein having a larger cross-section than said passageway, and a middle part having a central body portion with identical bosses extending therefrom, each boss being adapted to be received in one of the larger cross-section cavities in one of said end parts and having a central passageway therethrough, the inner end of each cavity being rounded and the outer end of each boss of said middle part having a rounded countersunk cavity therein, the space between the countersunk cavity of said boss and the inner end of said cavity defining a sensing chamber having rounded or curved end walls to minimize turbulent flow through the sensing chamber.

* * * * *